United States Patent
Maher, III et al.

(10) Patent No.: US 7,031,316 B2
(45) Date of Patent: *Apr. 18, 2006

(54) CONTENT PROCESSOR

(75) Inventors: Robert Daniel Maher, III, Plano, TX (US); Aswinkumar Vishanji Rana, Plano, TX (US); Milton Andre Lie, McKinney, TX (US); Kevin William Brandon, Dallas, TX (US); Mark Warden Hervin, Plano, TX (US); Corey Alan Garrow, Dallas, TX (US)

(73) Assignee: Netrake Corporation, Plano, TX (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/108,609

(22) Filed: Mar. 28, 2002

(65) Prior Publication Data

US 2002/0105910 A1 Aug. 8, 2002

Related U.S. Application Data

(63) Continuation of application No. 09/649,986, filed on Aug. 29, 2000, now Pat. No. 6,381,242.

(51) Int. Cl.
*H04L 12/56* (2006.01)
(52) U.S. Cl. .................................... 370/394
(58) Field of Classification Search ............... 370/392, 370/394, 395.3, 395.31, 395.4, 412, 428, 370/429, 474, 473
See application file for complete search history.

(56) References Cited

U.S. PATENT DOCUMENTS 5,339,311 A * 8/1994 Turner ........................ 370/394
5,481,536 A * 1/1996 Reisch et al. ................ 370/394
5,619,497 A * 4/1997 Gallagher et al. ........... 370/394
6,247,018 B1 * 6/2001 Rheaume ..................... 707/102
6,381,242 B1 * 4/2002 Maher et al. ................ 370/394
6,549,882 B1 * 4/2003 Chen et al. ................... 703/21

* cited by examiner

*Primary Examiner*—Kwang Bin Yao
(74) *Attorney, Agent, or Firm*—Haynes and Boone, LLP

(57) ABSTRACT

A content processor is described that is able to scan the contents of entire data packets including header and payload information. The content processor includes a queue engine operable to reorder out of order data packets and reassemble fragmented data packets. The queue engine sends the reordered and reassembled data packets to the context engine, which schedules the packets to be scanned. The packets are scanned by the content scanning engine using one or more string memories and one or more leaf string memories. The string memories are used by the content scanning engine to determine if there is a potential match between the data packet being scanned and any of the strings contained in database of known strings. If a potential match is identified, whether or not there is an exact match is determined using the leaf string memories and the leaf string compare engine. The scanning of the data packet results in a conclusion being generated by the content scanning engine. The conclusion can be an intermediate conclusion, can be an instruction to be executed by the content processor, can instruct the context engine to forward the information to a host processor for further analysis, or can be the final conclusion sent with the data packet with routing and quality of service treatment. Other uses for the conclusion are programmable in the content processor.

8 Claims, 4 Drawing Sheets

CONTENT PROCESSOR

CROSS-REFERENCE TO RELATED APPLICATIONS

This application is a continuation of application Ser. No. 09/649,986 which was filed on Aug. 29, 2000 now U.S. Pat. No. 6,381,242.

TECHNICAL FIELD OF THE INVENTION

The present invention relates to broadband data networking equipment. Specifically, the present invention relates to a content processor that scans, classifies and modifies network traffic based on content.

BACKGROUND OF THE INVENTION

The character and requirements of networks and networking hardware are changing dramatically as the demands on networks change. Not only is there an ever-increasing demand for more bandwidth, the nature of the traffic flowing on the networks is changing. With the demand for video and voice over the network in addition to data, end users and network providers alike are demanding that the network provide services such as quality-of-service (QoS), traffic metering, and enhanced security. However, the existing Internet Protocol (IP) networks were not designed to provide such services because of the limited information they contain about the nature of the data passing over them.

Existing network equipment that makes up the infrastructure was designed only to forward data through the network's maze of switches and routers without any regard for the nature of the traffic. The equipment used in existing networks, such as routers, switches, and remote access servers (RAS), are not able to process any information in the network data stream beyond the packet headers and usually only the headers associated with a particular layer of the network or with a set of particular protocols. Inferences can be made about the type of traffic by the particular protocol, or by other information in the packet header such as address or port numbers, but high-level information about the nature of the traffic and the content of the traffic is impossible to discern at wire speeds.

In order to better understand packet processing and the deficiencies of existing network equipment it is helpful to have an understanding of its basic operation. The functionality of most network equipment can be broken down into four basic components. The first component is the physical layer interface (PHY layer) which converts an analog waveform transmitted over a physical medium such as copper wire pairs, coaxial cable, optical fiber, or air, into a bit stream which the network equipment can process, and vice versa. The PHY layer is the first or last piece of silicon that the network data hits in a particular device, depending on the direction of traffic. The second basic functional component is the switch fabric. The switch fabric forwards the traffic between the ingress and egress ports of a device across the bus or backplane of that device. The third component is host processing, which can encompass a range of operations that lie outside the path of the traffic passing thought a device. This can include controlling communication between components, enabling configuration, and performing network management functions. Host processors are usually off-the-shelf general purpose RISC or CISC microprocessors.

The final component is the packet processing function, which lies between the PHY layer and the switch fabric.

Packet processing can be characterized into two categories of operation, those classified as fast-path and those classified as slow-path. Fast-path operations are those performed on the live data stream in real time. Slow-path operations are performed outside the flow of traffic but are required to forward a portion of the packets processed. Slow-path operations include unknown address resolution, route calculation, and routing and forwarding table updates. Some of the slow-path operations can be performed by the host processor if necessary.

For a piece of network equipment to be useful and effective, the vast majority of traffic must be handled on the fast-path in order to keep up with network traffic and to avoid being a bottleneck. To keep up with the data flow fast-path operations have always been limited both in number and in scope. There are five basic operations that have traditionally been fast-path operations: framing/parsing, classification, modification, encryption/compression, and queuing.

Traditionally the fast-path operations have been performed by a general purpose microprocessor or custom ASICs. However, in order to provide some programmability while maintaining speed requirements, many companies have recently introduced highly specialized network processors (NPUs) to operate on the fast-path data stream. While NPUs are able to operate at the same data rates as ASICs, such as OC-12, OC-48 and OC-192, they provide some level of programmability. Even with state of the art NPUs, however, fast-path operations must still be limited to specific, well-defined operations that operate only on very specific fields within the data packets. None of the current network devices, even those employing NPUs, are able to delve deep into a packet, beyond simple header information and into the packet contents while on the fast-path of data flow. The ability to look beyond the header information while still in the fast-path and into the packet contents would allow a network device to identify the nature of the information carried in the packet, thereby allowing much more detailed packet classification. Knowledge of the content would also allow specific contents to be identified and scanned to provide security such as virus detection, denial of service (DoS) prevention, etc. Further, looking deeper into the data packets and being able to maintain an awareness of content over an entire traffic flow would allow for validation of network traffic flows, and verification of network protocols to aid in the processing of packets down stream.

Accordingly, what is needed is a network device that can look beyond simple header information and into the packet contents or payload, to be able to scan the payload on the fast-path at wire speeds beyond 1 gigabit per second, and to be able to maintain state information or awareness throughout an entire data traffic flow.

SUMMARY OF THE INVENTION

The present invention provides for a content processor that is able to scan the entire contents of data packets forming a network data flow, the contents of data packets including both header and payload information. The content processor includes a queue engine, which is used to reorder out of order data packets and to reassemble fragmented data packets in the network data flow. A session id is used to associate each data packet with a particular flow. After being processed by the queue engine, a context engine schedules the scanning of the data packets. For scanning, data packets are broken into smaller blocks each block associated with a particular data packet, or context. To make the content processor more efficient, multiple contexts, each belonging to a different session, are processed simultaneously. Once scheduled, the contexts are sent to the content scanning engine to be scanned. The content scanning engine includes a string preprocessor which simplifies the string for scanning by compressing white space, etc. The content scanning engine then scans the data packets in two steps: first, the string memories which holds the database of known strings, is used to identify potential matches to the data packet; second, using the leaf string memories and the leaf string compare engine, it is determined whether there is an exact match between any identified potential match and the contents of the data packet.

A conclusion is generated in response to the scanning by the content scanning engine. The conclusion is programmable and can represent any information or instruction desired by the user. In general the conclusion will indicate one of a number of likely scenarios. For example, the conclusion will indicate that more scanning is required using the next block of data, that an action, or instruction, needs to be performed by the content processor, that information needs to be sent to the host processor for further processing, or when scanning is complete, that the packet is ready to be sent with the conclusion representing routing and quality of service treatment for the data packet. Instructions or actions to be taken are carried out by a script engine in the context engine, which is able to execute preprogrammed scripts. The context engine also includes a host interface, which is used for communication between the content processor and the host microprocessor.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
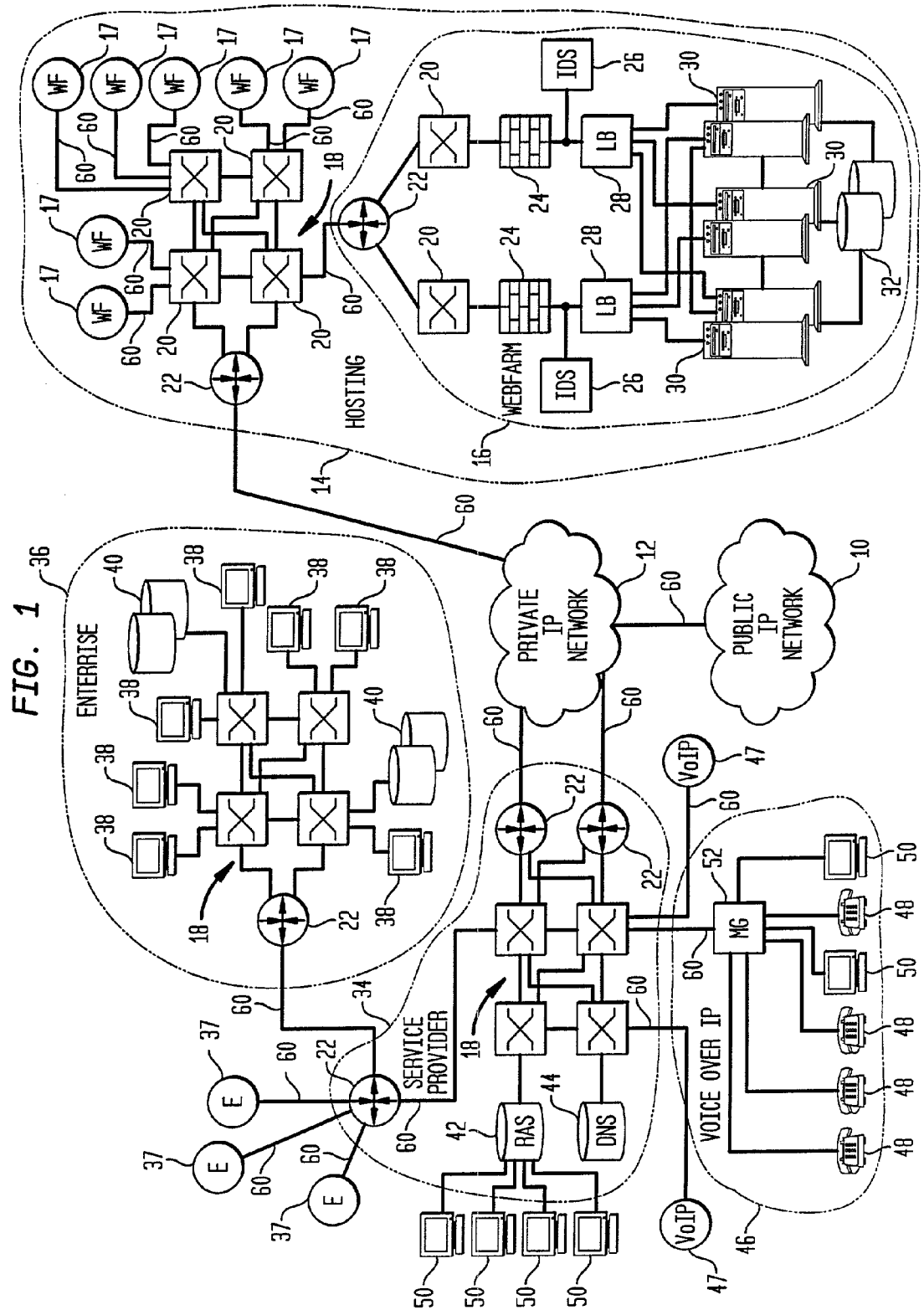
FIG. 1 is a network topology diagram illustrating example environments in which the present invention can operate.

Referring now to FIG. 1, a network topology is shown which is an example of several network infrastructures that connect in some manner to a broader public IP network 10 such as the internet. FIG. 1 is in no way meant to be a precise network architecture, but only to serve as a rough illustration of a variety of network structures which can exist on a broadband IP network. Public IP network 10 can be accessed in a variety of ways. FIG. 1 shows the public IP network being accessed through a private IP network 12 which can be the IP network of a company such as MCI or UUNET which provide private core networks. An endless variety of network structures can be connected to private IP network 12 in order to access other networks connected to private IP network 12 or to access public IP network 10.

One example of a network structure connecting to private IP network 12 is hosting network 14. Hosting network 14 is an example of a network structure that provides hosting services for internet websites. These hosting services can be in the form of webfarm 16. Webfarm 16 begins with webservers 30 and database 32 which contain the webpages, programs and databases associated with a particular website such as amazon.com or yahoo.com. Webservers 30 connect to redundant load balancers 28 which receive incoming internet traffic and assign it to a particular webserver to balance the loads across all of webservers 30. Redundant intrusion detection systems 26 and firewalls connect to load balancers 28 and provide security for webfarm 16. Individual webfarms 16 and 17 connect to hosting network 14's switched backbone 18 by means of a network of switches 20 and routers 22. Hosting network 14's switched backbone 18 is itself made up of a network of switches 20 which then connect to one or more routers 22 to connect to private IP network 12. Connections between individual webfarms 16 and 17 and the switched backbone 18 of hosting network 14 are usually made at speeds such as OC-3 or OC-12 (approx. 150 megabits/sec or 625 megabits/sec), while the connection from router 22 of hosting network 14 to private IP network 12 are on the order OC-48 speeds (approx. 2.5 gigabits/sec).

Another example of network structures connecting to private IP network are illustrated with service provider network 34. Service provider network 34 is an example of a network structure for Internet Service Providers (ISPs) or Local Exchange Carriers (LECs) to provide both data and voice access to private IP network 12 and public IP network 10. Service provider network 34 provides services such as internet and intranet access for enterprise networks 36 and 37. Enterprise networks 36 and 37 are, for example, company networks such as the company network for Lucent Technologies or Merrill Lynch. Each enterprise network, such as enterprise network 36, includes a plurality of network servers and individual workstations connected to a switched backbone 18, which can be connected by routers 22 to service provider network 34.

In addition to internet access for enterprise networks, service provider network 34 provides dial-up internet access for individuals or small businesses. Dial-up access is provided in service provider network 34 by remote access server (RAS) 42, which allows personal computers (PCs) to call into service provider network 34 through the public switched telephone network (PSTN), not shown. Once a connection has been made between the PC 50 and RAS 42 through the PSTN, PC 50 can then access the private or public IP networks 12 and 10.

Service provider network 34 also provides the ability to use the internet to provide voice calls over a data network referred to as Voice over IP (VoIP). VoIP networks 46 and 47 allow IP phones 48 and PCs 50 equipped with the proper software to make telephone calls to other phones, or PCs connected to the internet or even to regular phones connected to the PSTN. VoIP networks, such as VoIP network 46, include media gateways 52 and other equipment, not shown, to collect and concentrate the VoIP calls which are sent through service provider network 34 and private and public internet 12 and 10 as required. As mentioned, the advent of VoIP as well as other real time services such as video over the internet make quality of service a priority for service providers in order to match the traditional telephone service provided by traditional telephone companies.

Service provider network 34 includes a switched backbone 18 formed by switches 20 as well as routers 22 between it and its end users and between it and private IP network 12. Domain name servers 44 and other networking equipment, which are not shown, are also included in service provider network 34. Similar to hosting network 34, connection speeds for service provider network 34 can range from speeds such as T1, T3, OC-3 and OC-12 for connecting to enterprise networks 36 and 37 as well as VoIP networks 46 and 47 all the way to OC-48 and conceivably even OC-192 for connections to the private IP network.

It can easily be seen that aggregation points 60 exist at the edges of these various network structures where data is passed from one network structure to another at speeds such as OC-3, OC-12, and OC-48. One major problem in the network structures shown in FIG. 1 is the lack of any type of intelligence at these aggregation points 60 which would allow the network to provide services such as security, metering and quality of service. The intelligence to provide these services would require that the network understand the type of data passing through the aggregation points 60 and not just the destination and/or source information which is currently all that is understood. Understanding the type of data, or its contents, including the contents of the associated payloads as well as header information, and further understanding and maintaining a state awareness across each individual traffic flow would allow the network to configure itself in real time to bandwidth requirements on the network for applications such as VoIP or video where quality of service is a fundamental requirement. An intelligent, or "content aware", network would also be able to identify and filter out security problems such as email worms, viruses, denial of service (DoS) attacks, and illegal hacking in a manner that would be transparent to end users. Further, a content aware network would provide for metering capabilities by hosting companies and service providers, allowing these companies to regulate the amount of bandwidth allotted to individual customers as well as to charge precisely for bandwidth and additional features such as security.

In accordance with the requirements set forth above, the present invention provides for a network device that is able to scan, classify, and modify network traffic including payload information at speeds of OC-3, OC-12, OC-48 and greater thereby providing a "content aware" network.

Figure 2:
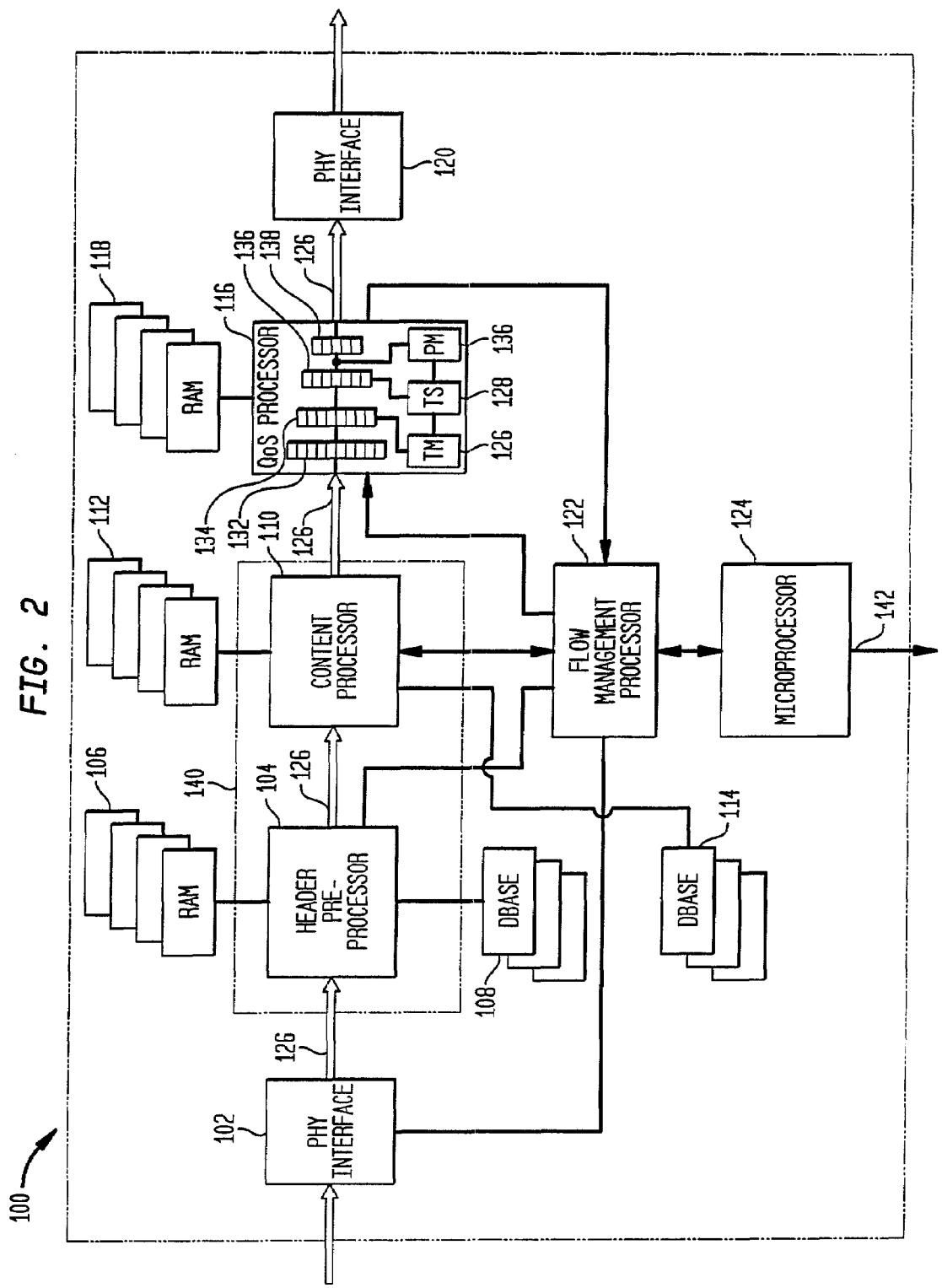
FIG. 2 is a block diagram of a single blade network apparatus according to the present invention.

Referring now to FIG. 2, one embodiment of a network apparatus according to the present invention is shown. Network apparatus 100, as shown, accepts data received from a high-speed network line or lines, processes the data, and then places the data back on a line or lines. Network apparatus 100 accepts data from the line by means of input physical interface 102. Input physical interface 102 can consist of a plurality of ports, and can accept any number of network speeds and protocols, including such high speeds as OC-3, OC-12, OC-48, and protocols including 10/100 Ethernet, gigabit Ethernet, and SONET. Input physical interface 102 takes the data from the physical ports, frames the data, and then formats the data for placement on fast-path data bus 126 which is preferably an industry standard data bus such as a POS-PHY Level 3, or an ATM UTOPIA Level 3 type data bus.

Fast-path data bus 126 feeds the data to traffic flow scanning processor 140, which includes header preprocessor 104 and content processor 110. The data is first sent to header preprocessor 104, which is operable to perform several operations using information contained in the data packet headers. Header preprocessor 104 stores the received data packets in packet storage memory 106 and scans the header information. The header information is scanned to identify the type, or protocol, of the data packet, which is used to determine routing information and to decode the IP header starting byte. As will be discussed below, network apparatus 100, in order to function properly, needs to reorder out of order data packets and reassemble data packet fragments. Header preprocessor 104 is operable to perform the assembly of asynchronous transfer mode (ATM) cells into complete data packets (PDUs), which could include the stripping of ATM header information.

After data packets have been processed by header preprocessor 104 the data packets, any conclusion formed by the header preprocessor, such as QoS information, are sent on fast-data path 126 to the other half of traffic flow scanning engine 140, content processor 110. The received packets are stored in packet storage memory 112 while they are processed by content processor 110. Content processor 110 is operable to scan the contents of data packets received from header preprocessor 104, including the entire payload contents of the data packets. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed or any additional fields in the data packet without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104 the session id can be created anywhere in traffic flow scanning engine 140 including in content processor 110.

The scanning of the header by content processor 110 also allows network apparatus 100 to perform routing functions. Routing tables and information can be stored in database memory 112. Routing instructions received by network apparatus 100 are identified, recorded and passed to microprocessor 124 by content processor 110 so that microprocessor 124 is able to update the routing tables in database memory 112 accordingly. While network apparatus 100 is shown as a single blade apparatus, the input and the output could be formed by multiple lines, for example four OC-12 lines could be connected to network apparatus 100 which operates at OC-48 speeds. In such a case, single blade network apparatus 100 will have limited routing or switching capabilities between the multiple lines, although the switching capability will be less than in a conventional router or switch. Additionally, a network apparatus can be constructed according to the principles of the present invention, which is able to operate as a network router or switch. Such an implementation is discussed in greater detail with reference to FIG. 4.

The contents of any or all data packets are compared to a database of known signatures and if the contents of a data packet, or packets, match a known signature, an action associated with that signature and/or session id can be taken by network apparatus 100. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network apparatus 100 to act on not only based on the content of the data packets being scanned but also based on the contents of the entire traffic flow. The specific operation of content processor 110 will be described with reference to FIG. 3.

Once the contents of the packets have been scanned and a conclusion reached by traffic flow scanning engine 140, the packets and the associated conclusions of either or both the header preprocessor and the content processor are sent to quality of service (QoS) processor 116. QoS processor 116 again stores the packets in its own packet storage memory 118 for forwarding. QoS processor 116 is operable to perform the traffic flow management for the stream of data packets processed by network apparatus 100. QoS processor contains engines for traffic management 126, traffic shaping 128 and packet modification 130.

QoS processor 116 takes the conclusion of either or both of header preprocessor 104 and content processor 110 and assigns the data packet to one of its internal quality of service queues 132 based on the conclusion. The quality of service queues 132 can be assigned priority relative to one another or can be assigned a maximum or minimum percentage of the traffic flow through the device. This allows QoS processor to assign the necessary bandwidth to traffic flows such as VoIP, video and other flows with high quality and reliability requirements while assigning remaining bandwidth to traffic flows with low quality requirements such as email and general web surfing to low priority queues. Information in queues that do not have the available bandwidth to transmit all the data currently residing in the queue according to the QoS engine is selectively discarded thereby removing that data from the traffic flow.

The quality of service queues 132 also allow network apparatus 100 to manage network attacks such as denial of service (DoS) attacks. Network apparatus 100 can act to qualify traffic flows by scanning the contents of the packets and verifying that the contents contain valid network traffic between known sources and destinations. Traffic flows that have not been verified because they are from unknown sources or because they are new unclassified flows can be assigned to a low quality of service queue until the sources are verified or the traffic flow classified as valid traffic. Since most DoS attacks send either new session information, data from spoofed sources, or meaningless data, network apparatus 100 would assign those traffic flows to low quality traffic queues. This ensures that the DoS traffic would receive no more than a small percentage (i.e. 5%) of the available bandwidth thereby preventing the attacker from flooding downstream network equipment.

The QoS queues 132 in QoS processor 116 (there are 65 k queues in the present embodiment of the QoS processor although any number of queues could be used) feed into schedulers 134 (1024 in the present embodiment), which feed into logic ports 136 (256 in the present embodiment), which send the data to flow control port managers 138 (32 is the present embodiment) which can correspond to physical egress ports for the network device. The traffic management engine 126 and the traffic shaping engine 128 determine the operation of the schedulers and logic ports in order to maintain traffic flow in accordance with the programmed parameters.

QoS processor 116 also includes packet modification engine 130, which is operable to modify, add, or delete bits in any of the fields of a data packet. This allows QoS processor 116 to change addresses for routing or to place the appropriate headers on the data packets for the required protocol. The packet modification engine 130 can also be used to change information within the payload itself if necessary. Data packets are then sent along fast-data path 126 to output PHY interface 120 where it is converted back into an analog signal and placed on the network.

As with all network equipment, a certain amount of network traffic will not be able to be processed along fast-data path 126. This traffic will need to be processed by on board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through network apparatus 100. In addition to processing odd, or missing packets, microprocessor 124 also controls the user management interface 142 and recompiles databases 108 and 114 to accommodate new signatures and can be used to learn and unlearn sessions identified by the traffic flow scanning engine 140.

As can be seen from the description of FIG. 2, network apparatus 100 allows the entire contents of any or all data packets received to be scanned against a database of known signatures. The scanned contents can be any variable or arbitrary length and can even cross packet boundaries. The abilities of network apparatus 100 allow the construction of a network device that is content aware which gives the network device the ability to operate on data packets based on the content of that data packet.

Figure 3:
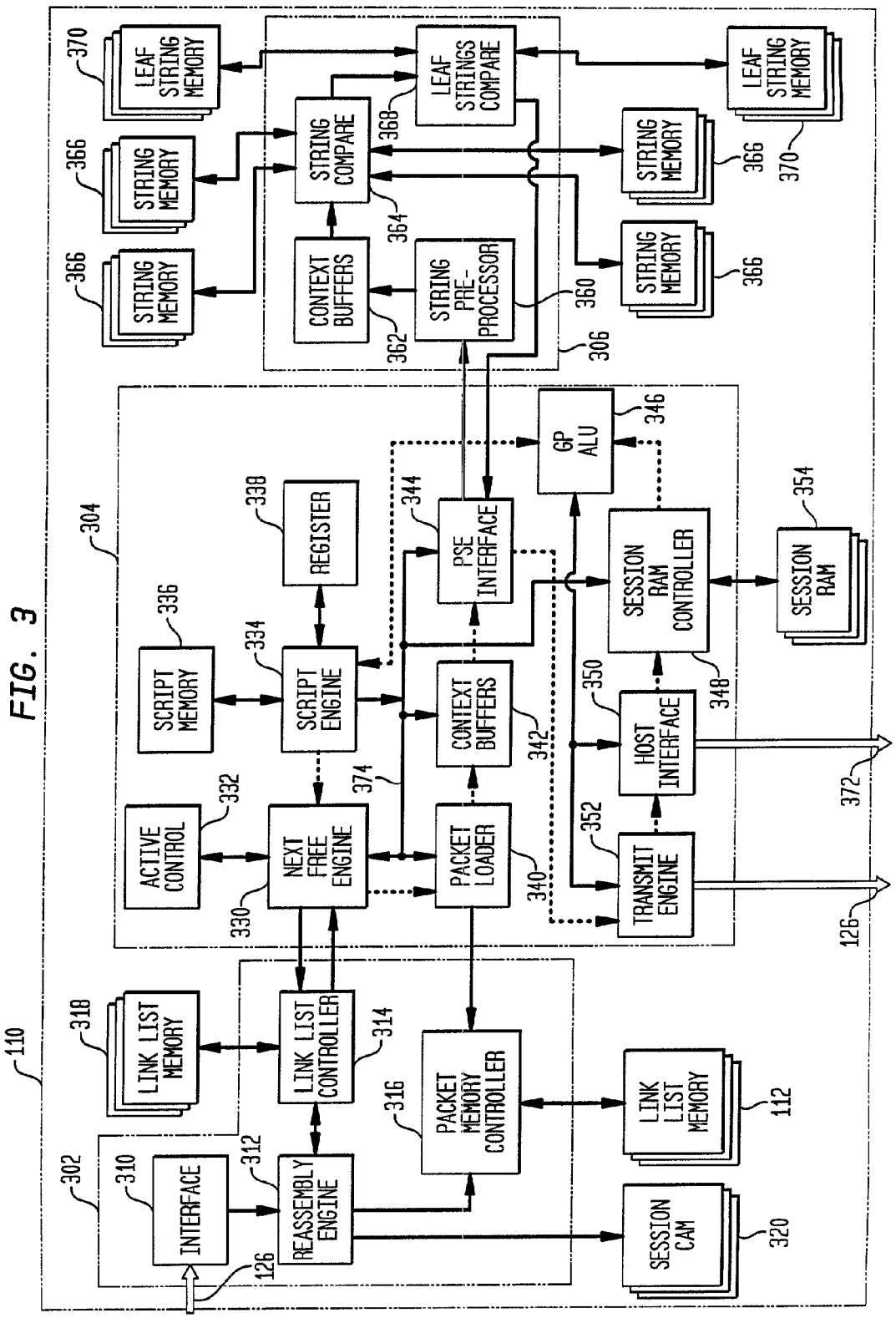
FIG. 3 is a block diagram of the content processor from FIG. 2.

Referring now to FIG. 3, the content processor 110 of FIG. 2 is described in greater detail. As described above content processor 110 is operable to scan the contents of data packets forwarded from header preprocessor 104 from FIG. 2. Content processor 110 includes three separate engines, queue engine 302, context engine 304, and content scanning engine 306.

Since content processor 110 scans the contents of the payload, and is able to scan across packet boundaries, content processor 110 must be able to reassemble fragmented packets and reorder out of order packets on a per session basis. Reordering and reassembling is the function of queue engine 302. Queue engine 302 receives data off the fast-path data bus 126 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. The data packets are broken into 256 byte blocks for storage within the queue engine 302. Session CAM 320 can store the session id generated by queue engine 302 of content processor 110. Reordering and reassembly engine 312 uses the session id to link data packets belonging to the same data flow.

In order to obtain the high throughput speeds required, content processor 110 must be able to process packets from multiple sessions simultaneously. Content processor 110 processes blocks of data from multiple data packets each belonging to a unique traffic flow having an associated session id. In the preferred embodiment of the present invention, context engine 304 of content processor 110 processes 64 byte blocks of 64 different data packets from unique traffic flows simultaneously. Each of the 64 byte blocks of the 64 different data flows represents a single context for the content processor. The scheduling and management of all the simultaneous contexts for content processor 110 is handled by context engine 304.

Context engine 304 works with queue engine 302 to select a new context when a context has finished processing and has been transmitted out of content processor 110. Next free context/next free block engine 330 communicates with link list controller 314 to identify the next block of a data packet to process. Since content processor 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified packet loader 340 uses the link list information retrieved by the next free context/next free block engine to retrieve the required block of data from packet memory 112 using packet memory controller 316. The new data block is then loaded into a free buffer from context buffers 342 where it waits to be retrieved by content scanning engine interface 344.

Content scanning engine interface 344 is the interface between context engine 304 and content scanning engine 306. When content scanning engine 306 has room for a new context to be scanned, content scanning engine interface 344 sends a new context to string preprocessor 360 in content scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by string compare 364. String compare 364 controls the input and output to signature memory 366. While four signature memories 366, each of which is potentially capable of handling multiple contexts, are shown any number could be used to increase or decrease the throughput through content scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memories 370 to perform a bit to bit comparison of the context and the potentially matched string. Although four string memories 366 and two leaf string memories 370 are shown, any number of string memories 366 and leaf string memories 370 can be used in order to optimize the throughput of content processor 110.

The conclusion of the content scanning are then sent back to the payload scanning interface 344 along with possibly a request for new data to be scanned. The conclusion of the content scanning can be any of a number of possible conclusions. The scanning may not have reached a conclusion yet and may need additional data from a new data packet to continue scanning in which case the state of the traffic flow, which can be referred to as an intermediate state, and any incomplete scans are stored in session memory 354 along with other appropriate information such as sequence numbers, counters etc. The conclusion reached by signature memory 366 may also be that scanning is complete and there is or isn't a match, in which case the data packet and the conclusion are sent to transmit engine 352 for passing to QoS processor 116 from FIG. 2. The scanning could also determine that the data packet needs to be forwarded to microprocessor 124 from FIG. 2 for further processing, so that the data packet is sent to host interface 350 and placed on host interface bus 372. In addition to handling odd packets, host interface bus 350 allows microprocessor 124 to control any aspect of the operation of content processor 110 by letting microprocessor 124 write to any buffer or register in context engine 304.

State information is stored in session memory 354 and is updated as necessary after data associated with the particular traffic flow is scanned. The state could be an intermediate state, representing that the matching is incomplete and additional data is needed to continue the scanning. Also, the state could be a partial state indicating that one or more events have occurred from a plurality of events required to generate a particular conclusion. The state may be a final state indicating that a final conclusion has been reached for the associated traffic flow and no further scanning is necessary. Or, the state may represent any other condition required or programmed into the content processor. The state information for each traffic flow, in whatever form, represents the content awareness of network apparatus 100 from FIG. 2, and allows the network apparatus to act not only on the information scanned, but also on all the information that has been previously scanned for each traffic flow.

The operation of transmit engine 352, host interface 350, session memory controller 348, which controls the use of session memory 354, and of general-purpose arithmetic logic unit (GP ALU) 346, which is used to increment or decrement counter, move pointers, etc., is controlled by script engine 334. Script engine 334 operates to execute programmable scripts stored in script memory 336 using registers 338 as necessary. Script engine 334 uses control bus 374 to send instruction to any of elements in context engine 304. Script engine 334 or other engines within content processor 100 have the ability to modify the contents of the data packets scanned. For example, viruses can be detected in emails scanned by content processor 100, in which case the content processor can act to alter the bits of infected attachment essentially rendering the email harmless.

The abilities of content processor 100 are unique in a number of respects. Content processor 100 has the ability to scan the contents of any data packet or packets for any information that can be represented as a signature or series of signatures. The signatures can be of any arbitrary length, can begin and end anywhere within the packets and can cross packet boundaries. Further, content processor 110 is able to maintain state awareness throughout all of the individual traffic flow by storing state information for each traffic flow representing any or all signatures matched during the course of that traffic flow. Existing network processors operate by looking for fixed length information at a precise point within each data packet and cannot look across packet boundaries. By only being able to look at fixed length information at precise points in a packet, existing network processors are limited to acting on information contained at an identifiable location within some level of the packet headers and cannot look into the payload of a data packet much less make decisions on state information for the entire traffic flow or even on the contents of the data packet including the payload.

Figure 4:
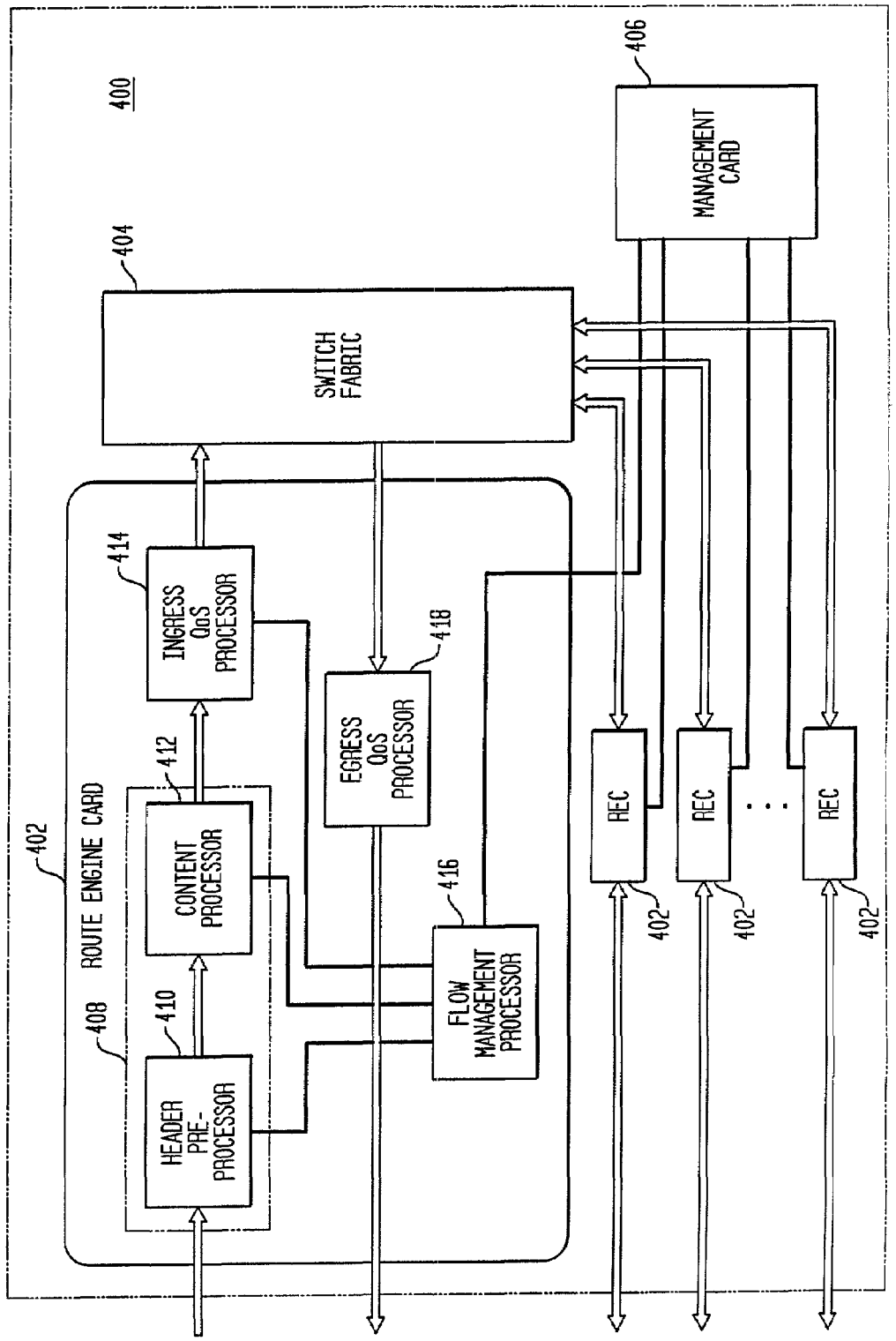
FIG. 4 is a block diagram of a multiple blade routing network apparatus according to the present invention.

Referring now to FIG. 4 an embodiment of the network apparatus of the present invention with routing capabilities is described. Routing network apparatus 400 is formed by two or more route engine cards, or blades, 402 connected to switch fabric 404. One or more management cards 406 are also included to provide a user interface and to manage route engine cards 402. Each of route engine cards 402 operate fundamentally as described with respect to network apparatus 100 of FIG. 2. Traffic flow scanning engine 408, formed by header preprocessor 410 and content processor 412, scans the contents of the data packets and generates a conclusion based on the contents. The packets and associated conclusions are forwarded to ingress QoS processor 414, which assigns the packets to a QoS queue. The data packets are then sent to the switch fabric, which forwards the data packets to the proper route engine card 402 for its assigned output port. The data packet then flows through the egress QoS processor 418, which schedules the traffic received from all the route engine cards 402 for transmission onto the network. The microprocessor 124 shown in FIG. 2 could be present on the route engine card 402 or could potentially be moved to the management card 406 to allow one microprocessor to support multiple route engine cards 402. Each of the route engine cards 402 could even have its own microprocessor with an additional microprocessor on management card 406.

Having multiple route engine cards with multiple ingress and egress paths allows routing network apparatus to function as a routing network device, as opposed to the single ingress and egress path of the "bump-in-the-line" device described with respect to FIG. 2. This allows the routing functions of header preprocessor 410 to be utilized in routing network apparatus 400.

While the header preprocessor, the QoS processors, and the flow management processor described with reference to FIGS. 2 and 4 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. Similarly the switch fabric may be any suitable switch fabric as is well known in the industry, including those manufactured by Power X Networks, Inc., 2833 Junction Ave., Suite 110, San Jose, Calif. The microprocessor described with reference to FIGS. 2 and 4 could be any suitable microprocessor including the PowerPC line of microprocessors from Motorola, Inc., or the X86 or Pentium line of microprocessors available from Intel Corporation. Although particular references have been made to specific protocols, implementations and materials, those skilled in the art should understand that the network apparatus, both the "bump-in-the-line" and the routing apparatus can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A content processor for scanning data packets on a data network, each data packet having associated contents, the content processor comprising:
   a content scanning engine operable to compare the contents, including a header and a payload, of the data packets with a database of known signatures, and to produce a conclusion based on the results of the comparison;
   a queue engine operable, before scanning by the content scanning engine, to reorder out of sequence data packets and to buffer data packets for scanning by the content scanning engine; and
   a context engine receiving the data packets, including the reordered data packets, from the queue engine and operable to schedule the data packets to be scanned by the content scanning engine.

2. The content processor of claim 1 wherein the content scanning engine scans first to determine a potential match from the database of known signatures, and second to determine whether the potential match matches the contents of the data packet.

3. The content processor of claim 1 wherein the context engine processes the data packet in multiple blocks.

4. The content processor of claim 1 each data packet is associated with a session id generated by the content processor and referenced to a particular location in a session CAM.

5. The content processor of claim 1 wherein the context engine further includes a script engine operable to execute user defined instructions, and wherein content scanning engine is able to call the script engine based upon the generated conclusion.

6. The content processor of claim 1 wherein the content scanning engine further includes a string preprocessor operable to compress white space in the contents of the data packet.

7. The content processor of claim 1 wherein the context engine further includes a host interface operable to send information to and receive information from a microprocessor.

8. The content processor of claim 1 wherein the content scanning engine is able to scan across multiple data packets by storing state in the session memory.

* * * * *